United States Patent
Chen et al.

(10) Patent No.: US 10,572,030 B2
(45) Date of Patent: Feb. 25, 2020

(54) COMPUTER SYSTEM AND KEYBOARD DEVICE

(71) Applicant: Chicony Electronics Co., Ltd., New Taipei (TW)

(72) Inventors: Chien-Shuo Chen, New Taipei (TW); Wan-Chen Ku, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 16/121,003

(22) Filed: Sep. 4, 2018

(65) Prior Publication Data

US 2019/0324556 A1    Oct. 24, 2019

(30) Foreign Application Priority Data

Apr. 20, 2018 (TW) .............................. 107113588 A

(51) Int. Cl.
*G06F 3/02* (2006.01)
*G06F 17/27* (2006.01)
*G06F 3/023* (2006.01)

(52) U.S. Cl.
CPC .............. *G06F 3/0227* (2013.01); *G06F 3/02* (2013.01); *G06F 3/0202* (2013.01); *G06F 3/023* (2013.01); *G06F 17/275* (2013.01)

(58) Field of Classification Search
CPC ........ G06F 3/0227; G06F 3/02; G06F 3/0202; G06F 17/275; H03M 11/003; H03M 11/02; H03M 11/04; H03M 11/00
See application file for complete search history.

(56) References Cited

U.S. PATENT DOCUMENTS

| | | | | |
|---|---|---|---|---|
| 4,279,021 A | * | 7/1981 | See ..................... | G06F 3/0238 341/23 |
| 4,459,581 A | * | 7/1984 | Wilson ................. | G06F 3/0238 341/23 |
| 6,014,616 A | * | 1/2000 | Kim ...................... | G06F 9/454 704/8 |
| 2003/0097554 A1 | * | 5/2003 | Cheston ................ | G06F 9/441 713/2 |
| 2006/0074627 A1 | * | 4/2006 | Moore ................... | G06F 9/454 704/8 |

FOREIGN PATENT DOCUMENTS

TW         201005589 A    2/2010

* cited by examiner

*Primary Examiner* — Xuemei Zheng
(74) *Attorney, Agent, or Firm* — Muncy, Geissler, Olds & Lowe, PC

(57) ABSTRACT

A computer system includes a keyboard device and a system device. The keyboard device includes a circuit board and a language identification device. The language identification device is connected to the circuit board and includes an identification circuit. The identification circuit is corresponding to identification information. The identification information is corresponding to a specific language adopted by the keyboard device. The system device includes a processor and a connector connected to the processor. The language identification device is connected to the connector such that the processor obtains the identification information. The processor determines an operating system corresponding to the specific language according to the identification information.

15 Claims, 6 Drawing Sheets

COMPUTER SYSTEM AND KEYBOARD DEVICE

CROSS-REFERENCE TO RELATED APPLICATION

This non-provisional application claims priority under 35 U.S.C. § 119(a) to Patent Application No. 107113588 filed in Taiwan, R.O.C. on Apr. 20, 2018, the entire contents of which are hereby incorporated by reference.

BACKGROUND

Technical Field

The instant disclosure relates to a keyboard device and, more particularly, to a keyboard device and a computer system capable of identifying languages.

Related Art

An operating system (OS) is a program managing hardware sources and software sources of a computer. A user can use a computer to work easier by the operating system. In general, the operating system is built in most of computers when leaving factory. Additionally, a language of the operating system is set to correspond to that used by the keyboard. For instance, if characters printed on the surface of the keyboard are English, the language of the operating system set in the computer while the computer leaves factory is accordingly English.

The language setting of the operating system at present is selected or operated in a manual manner. In other words, operating personnel determines which language the keyboard uses according to the characters printed on the surface of the keyboard and then selects or sets the operating system manually. Nevertheless, it is possible that a computer loaded with an incorrect operating system (i.e., the language of the operating system is not corresponding to that used by the keyboard) by human negligence in such manner, which results in a disturbance to users (for instance, the keyboard need to be replaced or the operating system need to be reset) and negatively affects the quality of product and goodwill.

SUMMARY

To address the above issues, a computer system comprising a keyboard device and a system device in accordance with embodiments of the invention is provided. The keyboard device comprises a circuit board and a language identification device. The language identification device is connected to the circuit board and comprises an identification circuit. The identification circuit is corresponding to an identification information. The identification information is corresponding to a specific language adopted by the keyboard device. The system device comprises a processor and a connector connected to the processor. The language identification device is connected to the connector such that the processor obtains the identification information. The processor determines an operating system corresponding to the specific language according to the identification information.

A keyboard device comprising a circuit board and a language identification device in accordance with embodiments of the invention is provided. The language identification device is connected to the circuit board. The language identification device comprises an identification circuit. The identification circuit is corresponding to identification information. The identification information is corresponding to a specific language adopted by the keyboard device.

Concisely, according to the keyboard device illustrated in embodiments of the instant disclosure, identification information corresponding to the specific language adopted by the keyboard device is generated via the language identification device, such that while the keyboard device is connected to the system device, the system device is able to obtain the identification information and automatically set the operating system to have the language thereof conformed to the language of the keyboard device according to the identification information. Thus the situation of incorrect system setting can be avoided and the quality of products can be improved.

DETAILED DESCRIPTION

Figure 1:
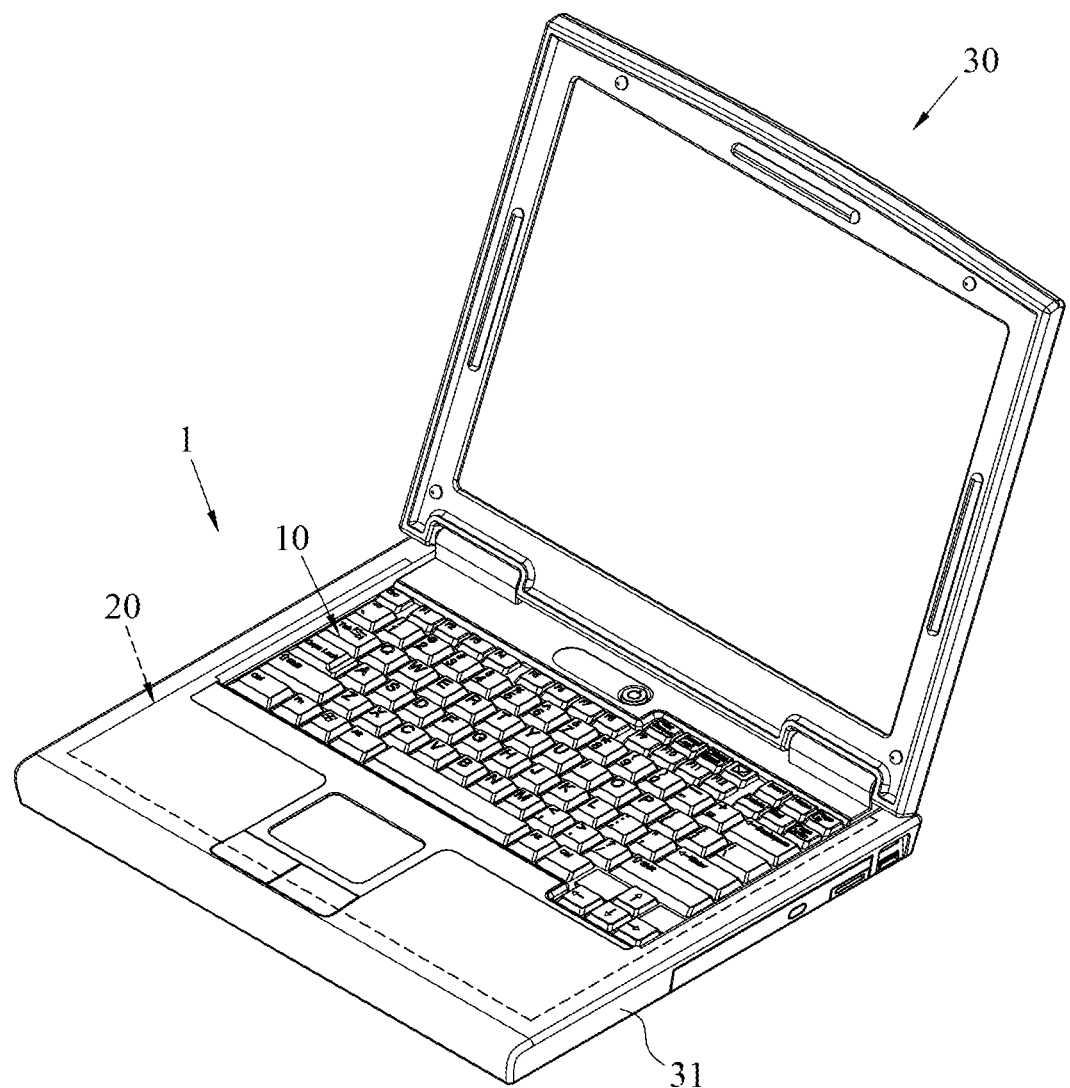
FIG. 1 illustrates a perspective view of a computer system according to an embodiment of the instant disclosure.

While varied embodiments are illustrated below, these embodiments are for illustration purpose only, and the scope of the instant disclosure for protection is not limited by these embodiments. In addition, some elements in the drawings of the embodiments may be omitted for clearly showing features of the instant disclosure. Same characters in all of the drawings represent the same or similar elements.

Figure 2:
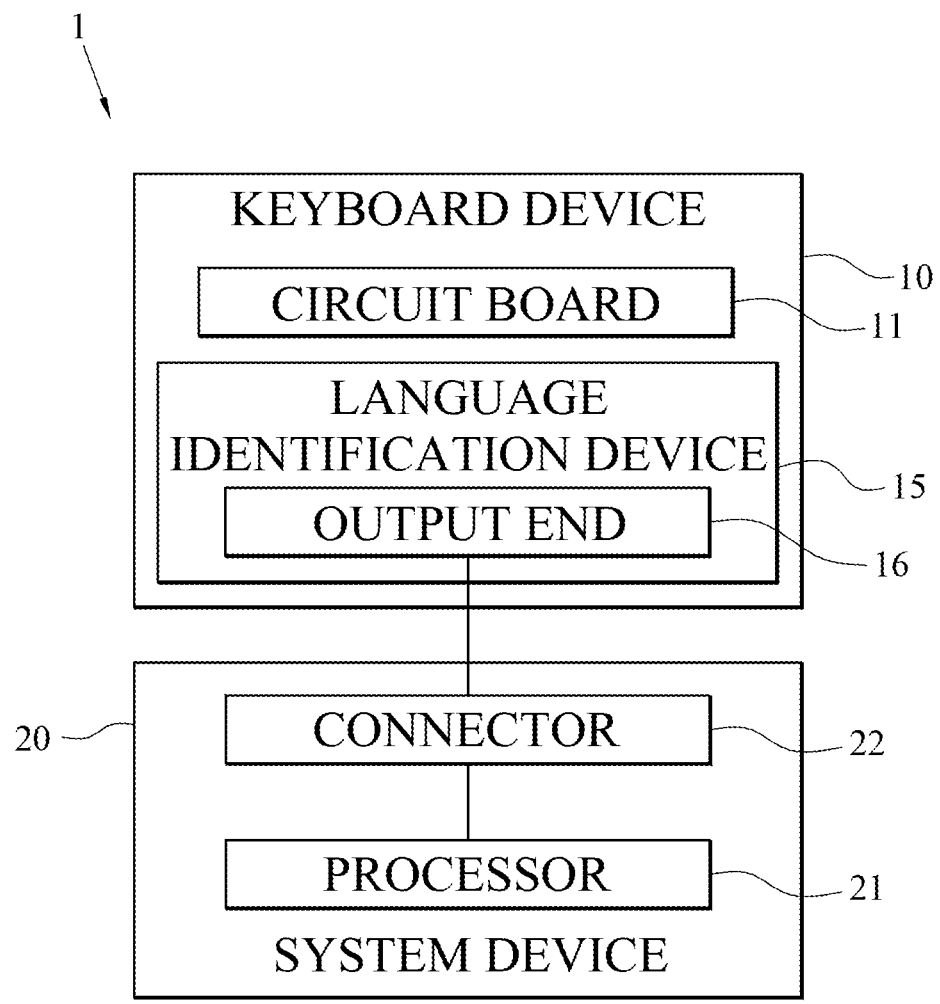
FIG. 2 illustrates a block diagram of hardware of the computer system according to an embodiment of the instant disclosure.

Please refer to FIG. 1 and FIG. 2, FIG. 1 is a perspective view of a computer system 1 according to an embodiment of the instant disclosure, and FIG. 2 is a block diagram of hardware of the computer system 1 according to an embodiment of the instant disclosure. As shown in FIG. 1 and FIG. 2, the computer system 1 comprises a keyboard device 10 and a system device 20, wherein the computer system 1 is, but is not limited to, adapted to a laptop computer, a desktop computer, an industrial computer, or a tablet computer.

As shown in FIG. 1 and FIG. 2, the embodiment is referred to a laptop computer. The system device 20 is a computer host of the laptop computer 30. The system device 20 is installed inside a housing 31 of the laptop computer 30. The system device 20 comprises a processor 21 and a connector 22 connected to the processor 21. In some embodiments, the processor 21 may be a central processing unit (CPU), a micro control unit (MCU), or a micro processing unit (MPU). The processor 21 may be utilized for controlling and coordinating operations between units in the computer, and for performing data calculating, logic determination, or the combination thereof. The connector 22 allows an external hardware to be electrically connected to the system device 20 to function as a bridge for signal transmission between the external hardware and the processor 21. In other embodiments, the system device 20 may be, but not limited to, a mainframe of a desktop computer, an industrial computer, or a tablet computer.

As shown in FIG. 1 and FIG. 2, the keyboard device 10 is for a user to operate to input information into the system device 20. Please refer to FIG. 3, which is an exploded view of the keyboard device 10 according to the first embodiment of the instant disclosure. In the embodiment, the keyboard device 10 comprises a circuit board 11, a keyboard signal line 12, a plurality of keys 13, a plurality of wire circuits 14, and a language identification device 15, wherein the circuit board 11 and the language identification device 15 may be, but not limited to, a printed circuit board (PCB) or a flexible printed circuit board (FPCB). For instance, the circuit board 11 and the language identification device 15 in the embodiment are flexible printed circuit boards.

The circuit board 11 is connected to the keyboard signal line 12. The keyboard signal line 12 is utilized for transmitting signals generated by the keys 13 that the user operates. The wire circuits 14 (e.g. a plurality of copper foil lines or silver paste lines) can be printed on a surface of the circuit board 11. The wire circuits 14 are gathered and extend to the keyboard signal line 12, wherein the keyboard signal line 12 may be integrated with the circuit board 11 into one-piece structure. The keyboard signal line 12 may be correspondingly connected to another connector 23 of the system device 20.

Figure 3:
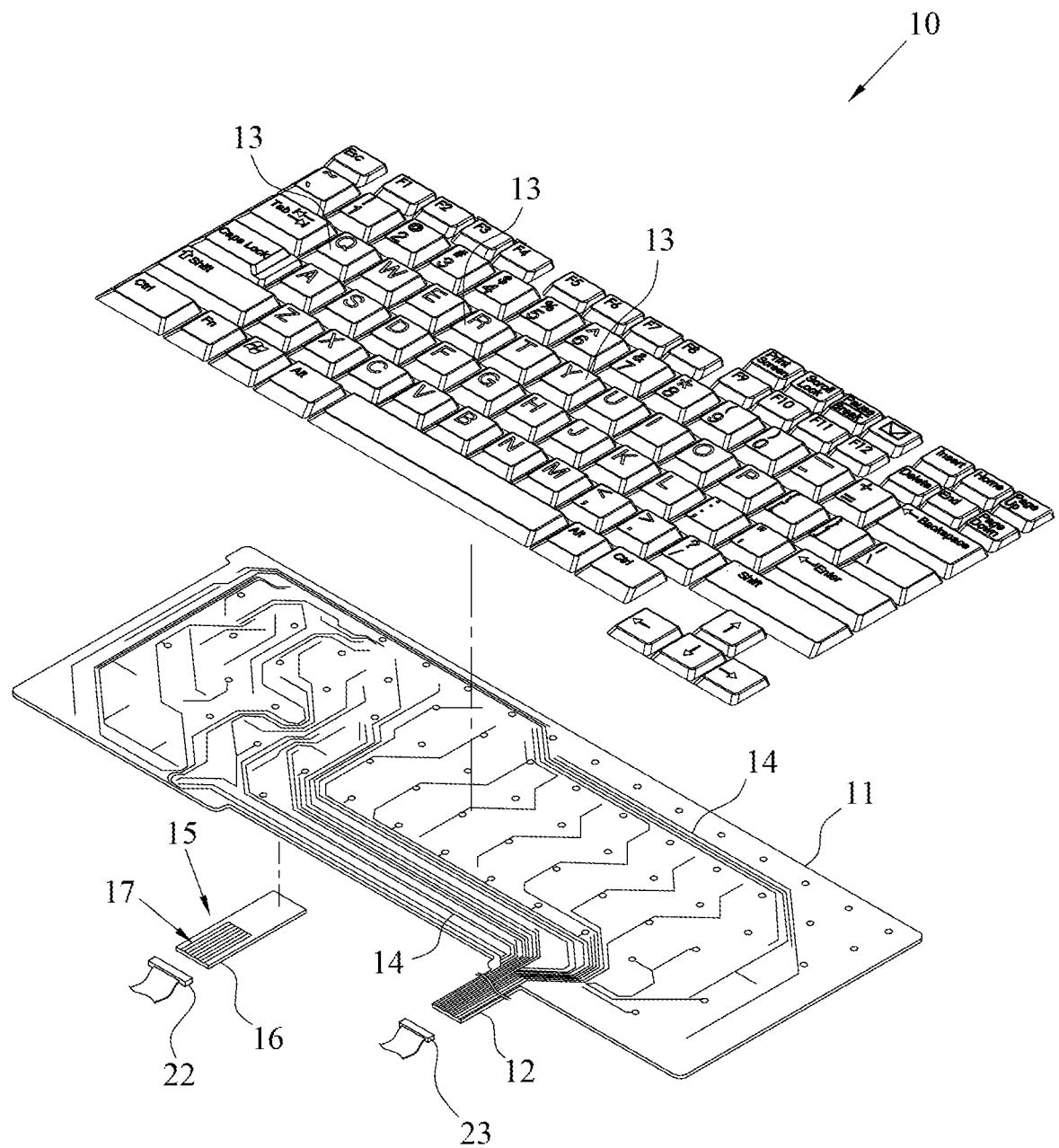
FIG. 3 illustrates an exploded view of a keyboard device according to the first embodiment of the instant disclosure.
Figure 4:
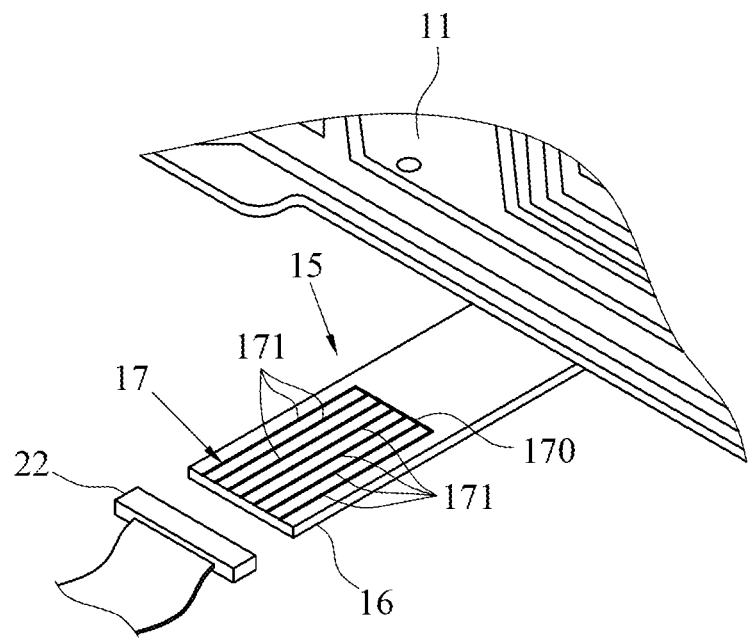
FIG. 4 illustrates a partial perspective view of the keyboard device according to the first embodiment of the instant disclosure.

In addition, as shown in FIG. 3 and FIG. 4, the language identification device 15 may be connected to the circuit board 11 (e.g., the language identification device 15 may be connected to the circuit board 11 in an adhesive attaching manner, in a thermal melting manner, or in an integrated forming manner) but not electrically connected to the circuit board 11, wherein the language identification device 15 comprises an output end 16. The output end 16 is provided with the identification circuit 17. The identification circuit 17 corresponds to an identification information. The identification information is corresponding to a specific language adopted by the keyboard device 10 (e.g., Chinese, Japanese, English, German, Spanish, Korean, etc.). While the output end 16 is connected to the connector 22, the processor 21 is able to obtain the identification information. In addition, the processor 21 is able to determine the specific language of the operating system corresponding to the keyboard device 10 according to the identification information. In particular, while the output end 16 is connected to the connector 22, the processor 21 transmits an electrical signal (e.g., a voltage signal or a level signal) to the language identification device 15 via an information detecting unit (not shown) and the connector 22. Next, the information detecting unit receives a feedback signal after the electrical signal is inputted to the identification circuit 17 of the output end 16 of the language identification device 15, and the processor 21 determines and obtains the identification information according to the feedback signal. The identification circuit 17 may comprise one or more wires. For instance, the one or more wires may be printed on an insulated substrate or a circuit board in a circuit printed manner. The above wires may form a circuit combination. The above wires may be connected to and communicate each other via a connection wire 170 near to an end of the circuit board 11. The above information detecting unit may be practiced by, for example, a chip, a circuit block in a chip, a firmware circuit, a circuit board having plural electronic components and wires, or a storage medium storing a number of program codes. Alternatively, the above information detecting unit may also be practiced by performing a corresponding software or program using an electronic apparatus, such as a computer system or a server.

For instance, if the identification circuit 17 is a first circuit combination, the language which corresponds to the identification information corresponding to the identification circuit 17 is Chinese. If the identification circuit 17 is a second circuit combination different from the first circuit combination, the language which corresponds to the identification information corresponding to the identification circuit 17 is English. Accordingly, while the language adopted by the keyboard device 10 is Chinese, the language identification device 15 with the identification circuit 17 having the first circuit combination could be installed to the circuit board 11, such that while the keyboard device 10 is connected to the connector 22 of the system device 20 via the output end 16 of the language identification device 15, the system device 20 can identify that the language adopted by the keyboard device 10 is Chinese according to the identification information and automatically determine and set the operating system to have the language thereof conformed to the Chinese. As a result, the situation of incorrect system setting can be avoided and the quality of products can be improved, effectively. The following is illustration regarding different embodiments.

Please refer to FIG. 4, FIG. 5, FIG. 6, and FIG. 7, which are partial perspective views of the keyboard device 10 according to different embodiments of the instant disclosure, respectively. In the embodiments of the instant disclosure, the identification circuit 17 could comprise at least one closed wire 171 (the closed wire 171 means that the wire is not cut open), at least one open wire 172 (the open wire 172 means that the wire has a circuit-removed section 173 to form an open state), or the combination thereof. For instance, in the embodiments shown in FIG. 3 and FIG. 4, the language identification device 15 is a circuit board, the identification circuit 17 comprises plural wires disposed on the output end 16, and the wires are parallel with each other and are all closed wires 171. According to the embodiments of the instant disclosure, the identification circuit 17 comprises, but not limited to, seven wires. Alternatively, the identification circuit 17 may comprise wires of which the number is less than seven or greater than seven. Alternatively, the identification circuit 17 may be a circuit combination with an irregular shape.

Table 1 is disclosed below for an example. In an embodiment, the identification circuit 17 comprises seven wires including at least one closed wire 171, at least one open wire 172, or the combination thereof, wherein the open wire 172 is a wire having a circuit-removed section 173 such that the wire forms an open state. For instance, the identification circuit 17 could comprise seven wires including seven closed wires 171, seven open wires 172, or the combination of the closed wires 171 and the open wires 172. While the output end 16 and the connector 22 are in connection, the processor 21 transmits an electrical signal (e.g. a level signal) to one of the wires of the identification circuit 17 via the information detecting unit (not shown) and the connector 22. Since the wires of the identification circuit 17 communicate with each other, the information detecting unit is able to receive a feedback signal from the closed wire 171 after transmitting the electrical signal to the identification circuit 17. The open wire 172 forms the open state due to the circuit-removed section 173; therefore, the information detecting unit is unable to receive the feedback signal from the open wire 172. In such case, the processor 21 determines that the closed wire 171 is not cut open according to the feedback signal and further determines that receiving the feedback signal is referred to as receiving a bit value "1." Analogously, the processor 21 determines that the open wire 172 is cut open under the circumstances that the processor 21 receives no feedback signal and further determines that not receiving the feedback signal is referred to as receiving a bit value "0."

In other words, while the closed wire 171 is connected to the connector 22, the bit value "1" is generated. The processor 21 of the system device 20 could determine that the closed wire 171 is corresponding to the bit value "1." While the open wire 172 is connected to the connector 22, the bit value "0" is generated. The processor 21 could determine that the open wire 172 is corresponding to the bit value "0." In the embodiment, the identification circuit 17 comprises seven wires, which are seven closed wires 171. For instance, after the output end 16 of the language identification device 15 with the identification circuit 17 is connected to the connector 22, the processor 21 could transmit the electrical signal (e.g., a level signal) to the leftmost closed wire 171 among the seven wires of the identification circuit 17 via the information detecting unit. Since each of the wires of the identification circuit 17 communicates with one another, the electrical signal inputted via the leftmost closed wire 171 could transmit to other wires via the connection wire 170. Next, the information detecting unit receives the feedback signal (i.e., the above electrical signal transmitted via the connection wire 170) via the seven closed wires 171 of the identification circuit 17. The processor 21 could determine that the bit values represented by the identification circuit 17 are the first set of the bit values "1 1 1 1 1 1 1" (i.e., the identification information) as shown in Table 1 and could determine that the language corresponding to the identification information "1 1 1 1 1 1 1" is English.

TABLE 1

|  | Bit Value | | | | | | | Corresponding Language |
| --- | --- | --- | --- | --- | --- | --- | --- | --- |
| 1st Set | 1 | 1 | 1 | 1 | 1 | 1 | 1 | English |
| 2nd Set | 1 | 1 | 1 | 1 | 1 | 1 | 0 | Chinese |
| 3rd Set | 1 | 1 | 1 | 1 | 1 | 0 | 1 | Japanese |
| . | | | . | | | . | | . |
| . | | | . | | | . | | . |
| . | | | . | | | . | | . |
| 38th Set | 1 | 1 | 0 | 0 | 0 | 0 | 1 | Russian |
| 39th Set | 1 | 0 | 0 | 0 | 0 | 0 | 1 | Spanish |
| 40th Set | 1 | 0 | 0 | 0 | 0 | 0 | 0 | Korean |

The above recitation that the processor 21 could transmit the electrical signal to the leftmost closed wire 171 among the seven wires of the identification circuit 17 via the information detecting unit is for illustration purpose only and is not of limitation. In other embodiments, the information detecting unit may transmit the electrical signal to another wire(s) of the identification circuit 17. In addition, it is noted that in some of the embodiments of the instant disclosure, the closed wire 171 is corresponding to the bit value "1," and the open wire 172 is corresponding to the bit value "0;" however, it is not of limitation. In other embodiments, the closed wire 171 is corresponding to the bit value "0," and the open wire 172 is corresponding to the bit value "1."

Figure 5:
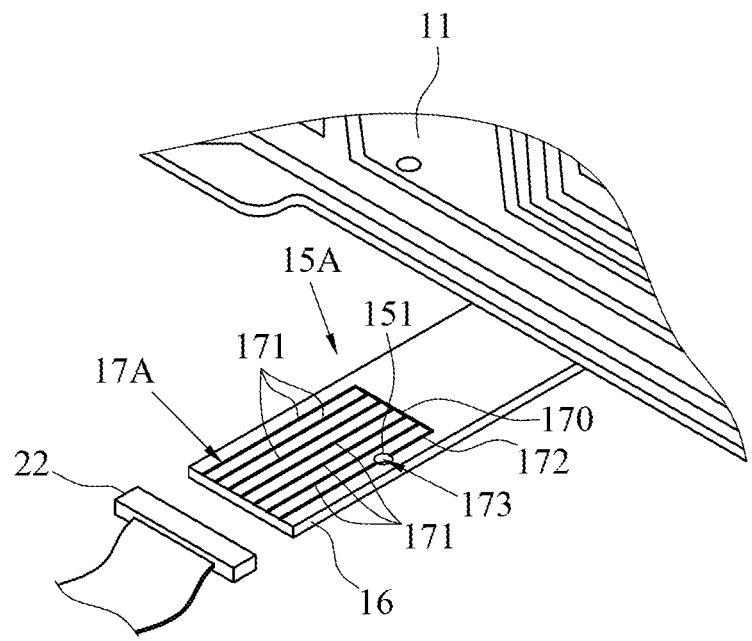
FIG. 5 illustrates a partial perspective view of a keyboard device according to the second embodiment of the instant disclosure.

Please refer to FIG. 5 and Table 1. FIG. 5 is a partial perspective view of the keyboard device 10 according to the second embodiment of the instant disclosure. The difference between the language identification device 15A in the embodiment and the language identification device 15 in the above first embodiment is that the identification circuit 17A of the language identification device 15A comprises six closed wires 171 and one open wire 172 (according to the viewing angle of FIG. 5, the rightmost wire of the identification circuit 17A is the open wire 172). As a result, after the identification circuit 17A is connected to the connector 22, the processor 21 may, for example, transmit the electrical signal (e.g., a level signal) to the leftmost closed wire 171 among the seven wires of the identification circuit 17A via the information detecting unit. Since each of the wires of the identification circuit 17A communicates with one another, the electrical signal inputted via the leftmost closed wire 171 could transmit to other wires via the connection wire 170. Next, the information detecting unit receives the feedback signal (i.e., the above electrical signal transmitted via the connection wire 170) via the first closed wire 171 to the sixth closed wire 171 of the identification circuit 17A from the left. The information detecting unit cannot receive the feedback signal from the rightmost wire because the rightmost wire is the open wire 172. According to the identification circuit 17A, the processor 21 could determine that corresponding bit values are the second set of the bit values "1 1 1 1 1 1 0" (i.e., the identification information) as shown in Table 1 and could determine that the language corresponding to the identification information "1 1 1 1 1 1 0" is Chinese.

Figure 6:
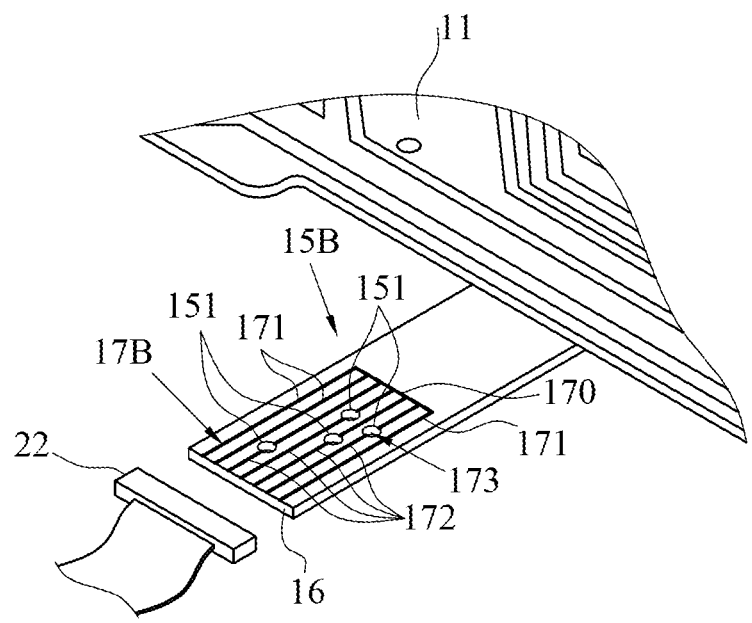
FIG. 6 illustrates a partial perspective view of a keyboard device according to the third embodiment of the instant disclosure.

Please refer to FIG. 6 and Table 1. FIG. 6 is a partial perspective view of the keyboard device 10 according to the third embodiment of the instant disclosure. The difference between the language identification device 15B in the embodiment and the language identification device 15 in the above first embodiment is that the identification circuit 17B of the language identification device 15B comprises three closed wires 171 and four open wires 172 (according to the viewing angle of FIG. 6, the second wire, the third wire, the fourth wire, and the fifth wire of the identification circuit 17B from the right are the open wires 172). As a result, after the identification circuit 17B is connected to the connector 22, the processor 21 may, for example, transmit the electrical signal (e.g., a level signal) to the leftmost closed wire 171 among the seven wires of the identification circuit 17B via the information detecting unit. Since each of the wires of the identification circuit 17B communicates with one another, the electrical signal inputted via the leftmost closed wire 171 could transmit to other wires via the connection wire 170. Next, the information detecting unit receives the feedback signal (i.e., the above electrical signal transmitted via the connection wire 170) via the leftmost two closed wires 171 and the rightmost one closed wire 171. The information detecting unit cannot receive the feedback signal from the second wire, the third wire, the fourth wire, and the fifth wire from the right because these wires are the open wires 172. The processor 21 could determine that the bit values represented by the identification circuit 17B are the thirty-eighth set of the bit values "1 1 0 0 0 0 1" (i.e., the identification information) as shown in Table 1 and could determine that the language corresponding to the identification information "1 1 0 0 0 0 1" is Russian.

Figure 7:
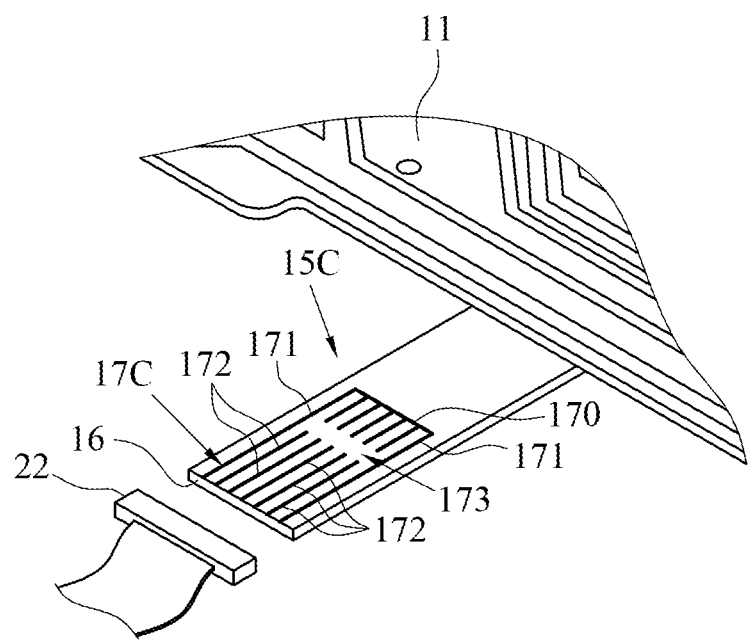
FIG. 7 illustrates a partial perspective view of a keyboard device according to the fourth embodiment of the instant disclosure.

Please refer to FIG. 7 and Table 1. FIG. 7 is a partial perspective view of the keyboard device 10 according to the fourth embodiment of the instant disclosure. The difference between the language identification device 15C in the embodiment and the language identification device 15 in the above first embodiment is that the identification circuit 17C of the language identification device 15C comprises two closed wires 171 and five open wires 172 (According to the viewing angle of FIG. 7, the five wires in the middle of the identification circuit 17C are the open wires 172). As a result, after the identification circuit 17C is connected to the connector 22, the processor 21 may, for example, transmit the electrical signal (e.g., a level signal) to the leftmost closed wire 171 among the seven wires of the identification circuit 17C via the information detecting unit. Since each of the wires of the identification circuit 17C communicates with one another, the electrical signal inputted via the leftmost closed wire 171 could transmit to other wires via the connection wire 170. Next, the information detecting unit receives the feedback signal (i.e., the above electrical signal transmitted via the connection wire 170) via the leftmost closed wire 171 and the rightmost closed wire 171. The information detecting unit cannot receive the feedback signal from the second wire to the sixth wire from the left (i.e., the five wires in the middle) because these wires are the open wires 172. The processor 21 could determine that the bit values represented by the identification circuit 17C are the thirty-ninth set of the bit values "1 0 0 0 0 0 1" (i.e., the identification information) as shown in Table 1 and could determine that the language corresponding to the identification information "1 0 0 0 0 0 1" is Spanish. In the above embodiments, the closed wire 171 is corresponding to the bit value "1," and the open wire 172 is corresponding to the bit value "0."

Accordingly, there are forty or more combinations of wires in different combinations of the closed wire(s) 171 and the open wire(s) 172 that may be corresponding to forty or more languages, respectively (as shown in Table 1). As a result, while the language adopted by the keyboard device 10 is English, the above language identification device 15 could be selected. While the language adopted by the keyboard device 10 is Chinese, the above language identification device 15A could be selected. While the language adopted by the keyboard device 10 is Russian, the above language identification device 15B could be selected. While the language adopted by the keyboard device 10 is Spanish, the above language identification device 15C could be selected. Other examples could be analogous to the above examples. In addition, in another embodiment, while the number of the languages adopted by the keyboard device 10 are more than forty, the number of the wires of the identification circuit 17 could be increased (e.g., seven wires may be increased to eight, nine, or ten wires) to satisfy the need in practice. Alternatively, the number of the wires of the identification circuit 17 could also be decreased to satisfy the need in practice.

For further instance, as shown in FIG. 3, FIG. 4, and Table 1, FIG. 4 is a partial perspective view of the embodiment of FIG. 3. The keyboard device 10 in the embodiment comprises a plurality of keys 13 utilized for word input. Each of the keys 13 is provided with English letters (e.g., English letters could be printed on each of the keys 13), which means that the language adopted by the keyboard device 10 is English. Operating personnel could have the language identification device 15 with identification circuit 17 having seven closed wires 171 installed on the circuit board 11. While the output end 16 of the language identification device 15 is connected to the connector 22 of the system device 20, the processor 21 could determine that the bit values are the first set of the bit values "1 1 1 1 1 1 1" (i.e., the identification information) as shown in Table 1. According to the identification information, the processor 21 could determine that the language adopted by the keyboard device 10 is English and automatically set the operating system to be corresponding to English. In the embodiment of the instant disclosure, the system device 20 may comprise a lookup table (e.g. the above Table 1). The lookup table comprises a plurality of language comparison information (e.g. the sets of the bit values and corresponding languages in Table 1). The processor 21 could compare the identification information (i.e., the bit values "1 1 1 1 1 1 1") with each of the language comparison information (the sets of the bit values in Table 1) to determine that the language adopted by the keyboard device 10 is English and set the operating system to be corresponding to English. In the embodiment of the instant disclosure, it is noted that the relations between the sets of the bit values and corresponding languages in Table 1 are for illustration purpose only. The sets of the bit values represented by the identification circuit 17 and the relations between the sets of the bit values and corresponding languages are not limited to the embodiments.

Please refer to FIG. 5, FIG. 6, and FIG. 7. In the embodiment of the instant disclosure, each of the open wires 172 in the identification circuit 17A of the language identification device 15A, in the identification circuit 17B of the language identification device 15B, and in the identification circuit 17C of the language identification device 15C has the circuit-removed section 173 to form the open state. For instance, as shown in FIG. 5, in the embodiment, a hole 151 is opened on the language identification device 15A by a tool (e.g. the hole 151 may be formed by stamping or drilling) to penetrate through the rightmost wire of the identification circuit 17A, such that the wire forms the open wire 172. As shown in FIG. 6, in the embodiment, a plurality of holes 151 is opened on the language identification device 15B by a tool to respectively penetrate through plural wires of the identification circuit 17B to form plural open wires 172. Alternatively, as shown in FIG. 7, in the embodiment, partial sections of several original, complete wires of the language identification device 15C are scraped out by a tool to form the open wires 172. The above embodiments are for illustration purpose only. In practice, the open wire 172 could be formed in other manners. For instance, a partial section of a complete wire may be removed by planning, grinding, cutting, or other manners of surface treatment.

Accordingly, in the embodiments of the instant disclosure, a partial section of a part of the closed wires 171 could be removed, such that the identification circuit 17 could comprise the closed wire(s) 171 and/or the open wire(s) 172 to form different circuit combinations (e.g. the above identification circuits 17A, 17B, and 17C). As a result, material preparation is easier, cost is lower, and the issue of being out of stock can be avoided. In addition, it is beneficial to stock management and maintenance. For instance, as shown in FIG. 4 to FIG. 7, only one type of circuit board, i.e. the language identification device 15 (as shown in FIG. 4), is needed in stock. While the fabrication of the keyboard device 10 corresponding to another language is in demand, the identification circuit 17 of the language identification device 15 in stock can be altered by removing a part of circuit to form another circuit combination (e.g. the identification circuit 17A of FIG. 5, the identification circuit 17B of FIG. 6, and the identification circuit 17C of FIG. 7), such that the language identification circuit 15 can be adapted to the keyboard device 10 using another language.

Please refer to FIG. 3. In an embodiment of the instant disclosure, the output end 16 of the language identification device 15 and the keyboard signal line 12 are at different locations of the circuit board 11. During assembling, the output end 16 of the language identification device 15 and the keyboard signal line 12 are connected to the system device 20, respectively. For instance, as shown in FIG. 3, the output end 16 of the language identification device 15 could be correspondingly connected to the connector 22 of the system device 20 to facilitate the identifying of the language adopted by the keyboard device 10. The keyboard signal line 12 could be connected to another connector 23 of the system device 20 for transmitting the signal generated by the keys 13 being operated to the system device 20 to perform corresponding operations (e.g. word input or command execution). In the embodiment, the identification circuit 17 of the language identification device 15 is not electrically connected to the circuit board 11.

Figure 8:
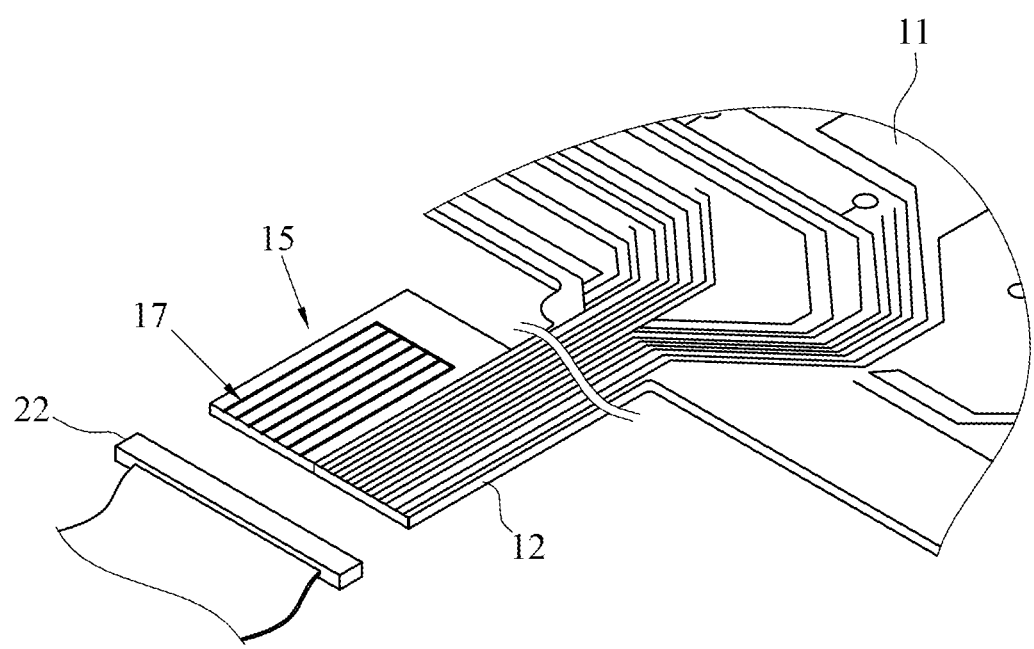
FIG. 8 illustrates a partial perspective view of a keyboard device according to the fifth embodiment of the instant disclosure.

In another embodiment of the instant disclosure, the output end 16 of the language identification device 15 could also be integrated with the keyboard signal line 12. Please refer to FIG. 8. FIG. 8 is a partial perspective view of the keyboard device 10 according to the fifth embodiment of the instant disclosure. In the embodiment, the language identification device 15 could be connected to the keyboard signal line 12 in parallel (e.g. the language identification device 15 could be connected to the keyboard signal line 12 in an adhesive attaching manner or in a thermal melting manner), such that the output end 16 of the language identification device 15 and the keyboard signal line 12 could be jointly connected to the connector 22 of the system device 20. As a result, the number of the connectors of the system device 20 can be decreased. Accordingly, cost can be lower, and assembling process can be simplified. In other embodiments, the language identification device 15 could be integrated with the keyboard signal line 12 into one-piece structure. In such case, the language identification device 15 could be printed with circuits along with the circuit board 11 in the fabricating process; therefore, assembling process could be further simplified.

In the embodiments of the instant disclosure, the output end 16 of the language identification device 15, 15A, 15B, or 15C and the keyboard signal line 12 could be positioned at different locations of the circuit board 11. During assembling, the output end 16 of the language identification device 15, 15A, 15B, or 15C and the keyboard signal line 12 are respectively connected to the system device 20. The output end 16 of the language identification device 15, 15A, 15B, or 15C could be integrated with the keyboard signal line 12 or could be formed along with the keyboard signal line 12 into one-piece structure.

According to embodiments of the instant disclosure, the computer system and the keyboard device are disclosed. The system device is able to obtain the identification information and the language adopted by the keyboard device via the language identification device and automatically set the operating system to have the language thereof conformed to the language of the keyboard device according to the identification information and the language adopted by the keyboard device. The risk that a computer is loaded with an incorrect operating system by human negligence can be reduced. The situation of incorrect system setting can be avoided. The quality of products can be improved Concisely, while the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is indicated by the following claims and their equivalents.

What is claimed is:

1. A computer system, comprising:
a keyboard device comprising a circuit board and a language identification device independently arranged from each other, the language identification device is a printed circuit board and comprising an identification circuit and an insulated substrate, wherein the identification circuit comprises a plurality of wires printed on the insulated substrate, the insulated substrate of the language identification device is mounted on the surface of the circuit board without being electrically connected, at least one of the wires comprises a circuit-removed section, the identification circuit being corresponding to an identification information, the identification information being corresponding to a specific language adopted by the keyboard device; and
a system device comprising a processor and a connector connected to the processor, the language identification device being connected to the connector such that the processor obtains the identification information, the processor determining an operating system corresponding to the specific language according to the identification information.

2. The computer system of claim 1, wherein the wires are connected with each other via a connection wire.

3. The computer system of claim 1, wherein the circuit-removed section is formed by opening a hole or scraping a circuit.

4. The computer system of claim 1, wherein the circuit board is connected to a keyboard signal line, and the language identification device and the keyboard signal line are at different locations of the circuit board.

5. The computer system of claim 1, wherein the circuit board is connected to a keyboard signal line, and the language identification device is integrated with the keyboard signal line and is connected to the connector along with the keyboard signal line.

6. The computer system of claim 1, wherein the system device further comprises a lookup table, the lookup table comprises a plurality of language comparison information, the processor compares the identification information with the language comparison information to obtain the specific language and determines the operating system according to the specific language.

7. A keyboard device, comprising:
a circuit board; and
a language identification device independently arranged from the circuit board, the language identification device is a printed circuit board and comprising an identification circuit and an insulated substrate, wherein the identification circuit comprises a plurality of wires printed on the insulated substrate, the insulated substrate of the language identification device is mounted on the surface of the circuit board without being electrically connected, at least one of the wires comprises a circuit-removed section, the identification circuit being corresponding to an identification information, the identification information being corresponding to a specific language adopted by the keyboard device.

8. The keyboard device of claim 7, wherein the wires are connected with each other via a connection wire.

9. The keyboard device of claim 7, wherein the circuit-removed section is formed by opening a hole or scraping a circuit.

10. The keyboard device of claim 7, wherein the circuit board is connected to a keyboard signal line, and the language identification device and the keyboard signal line are at different locations of the circuit board.

11. The keyboard device of claim 7, wherein the circuit board is connected to a keyboard signal line, and the language identification device is integrated with the keyboard signal line.

12. A keyboard device, comprising:
a circuit board; and
a language identification device independently arranged from the circuit board, the language identification device is a printed circuit board and comprising an identification circuit and an insulated substrate, wherein the identification circuit comprises a plurality of wires printed on the insulated substrate, the insulated substrate of the language identification device is mounted on the surface of the circuit board without being electrically connected, the identification circuit being corresponding to an identification information, the identification information being corresponding to a specific language adopted by the keyboard device.

13. The keyboard device of claim 12, wherein the wires are connected with each other via a connection wire.

14. The keyboard device of claim 12, wherein the circuit board is connected to a keyboard signal line, and the language identification device and the keyboard signal line are at different locations of the circuit board.

15. The keyboard device of claim 12, wherein the circuit board is connected to a keyboard signal line, and the language identification device is integrated with the keyboard signal line.

* * * * *